(12) United States Patent
Sakai et al.

(10) Patent No.: US 12,103,380 B2
(45) Date of Patent: Oct. 1, 2024

(54) VALVE DEVICE

(71) Applicant: PIOLAX, INC., Kanagawa (JP)

(72) Inventors: Takahiro Sakai, Kanagawa (JP);
Atsuki Teramoto, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 18/267,663

(22) PCT Filed: Nov. 15, 2021

(86) PCT No.: PCT/JP2021/041933
§ 371 (c)(1),
(2) Date: Jun. 15, 2023

(87) PCT Pub. No.: WO2022/137887
PCT Pub. Date: Jun. 30, 2022

(65) Prior Publication Data
US 2024/0100939 A1  Mar. 28, 2024

(30) Foreign Application Priority Data
Dec. 22, 2020 (JP) .................................. 2020-212834

(51) Int. Cl.
*F16K 24/04* (2006.01)
*B60K 15/035* (2006.01)
*B60K 15/03* (2006.01)

(52) U.S. Cl.
CPC .......... *B60K 15/035* (2013.01); *F16K 24/044* (2013.01); *B60K 2015/03256* (2013.01); *Y10T 137/3099* (2015.04)

(58) Field of Classification Search
CPC ........ F16K 24/044; F16K 21/18; F16K 24/02; F16K 31/18–28; F16K 33/00;
(Continued)

(56) References Cited

U.S. PATENT DOCUMENTS 4,753,262 A    6/1988  Bergsma
7,784,484 B2 *  8/2010  Furuya .................. F16K 24/044
                                                    137/202
(Continued)

FOREIGN PATENT DOCUMENTS

JP    2007-016923 A    1/2007
JP    2007-153182 A    6/2007
(Continued)

OTHER PUBLICATIONS

Jan. 25, 2022, International Search Report issued for related PCT Application No. PCT/JP2021/041933.
(Continued)

*Primary Examiner* — Craig J Price
(74) *Attorney, Agent, or Firm* — Paratus Law Group, PLLC

(57) ABSTRACT

There is provided a valve device including: a housing; and a float valve. The float valve includes a main float, a sub-float held at an upper portion of the main float to be able to ascend and descend by a predetermined distance with respect to the main float, and a sub-float biasing spring disposed between the main float and the sub-float and configured to bias the sub-float upward with respect to the main float. The sub-float includes a spring support portion configured to support an upper end of the sub-float biasing spring and a seal portion that is configured to come into contact with and separate from an opening portion. The main float is movable further upward with respect to the sub-float by compressing the sub-float biasing spring in a state where the float valve ascends and the opening portion is closed by the sub-float.

6 Claims, 15 Drawing Sheets

(58) Field of Classification Search
CPC ........... B60K 2015/03289; B60K 2015/03256; B60K 15/035; B60K 15/03504; B60K 15/03519; Y10T 137/7404; Y10T 137/7323; Y10T 137/7358; Y10T 137/3099; Y10T 137/86324; Y10T 137/053; Y10T 137/6004; Y10T 137/0874; F02M 25/0836; F02M 25/0872; G05D 7/0166; G05D 16/12
USPC .......................................... 137/43, 202, 423
See application file for complete search history.

(56) References Cited

U.S. PATENT DOCUMENTS

| | | | | |
|---|---|---|---|---|
| 8,141,576 | B2* | 3/2012 | Matsuo | F16K 31/22 137/202 |
| 9,903,318 | B2* | 2/2018 | Mihara | F16K 27/07 |
| 10,041,450 | B2* | 8/2018 | Walkowski | F02M 25/0836 |
| 10,059,196 | B2* | 8/2018 | Walkowski | B60K 15/035 |
| 11,186,166 | B2* | 11/2021 | Iiduka | B60K 15/03519 |
| 11,733,718 | B2* | 8/2023 | Mihara | B60K 15/035 137/398 |
| 11,845,332 | B2* | 12/2023 | Yajima | B60K 15/03504 |
| 2006/0000091 | A1* | 1/2006 | Zorine | F16K 24/044 29/890.12 |
| 2006/0108000 | A1* | 5/2006 | Kaneko | F16K 24/044 137/202 |
| 2007/0006919 | A1 | 1/2007 | Tagami et al. | |
| 2007/0125428 | A1 | 6/2007 | Furuya | |
| 2009/0178719 | A1 | 7/2009 | Matsuo | |
| 2015/0144204 | A1 | 5/2015 | Walkowski et al. | |
| 2019/0210456 | A1* | 7/2019 | Walkowski | F16K 31/22 |

FOREIGN PATENT DOCUMENTS

| | | | |
|---|---|---|---|
| JP | 2009-168045 | A | 7/2009 |
| JP | 2016-507689 | A | 3/2016 |

OTHER PUBLICATIONS

Jan. 25, 2022, International Search Opinion issued for related PCT Application No. PCT/JP2021/041933.
Dec. 15, 2022, International Preliminary Report on Patentability issued for related PCT Application No. PCT/JP2021/041933.
Dec. 15, 2022, Translation of International Preliminary Report on Patentability issued for related PCT Application No. PCT/JP2021/041933.

* cited by examiner

VALVE DEVICE

CROSS REFERENCE TO PRIOR APPLICATION

This application is a National Stage Patent Application of PCT International Patent Application No. PCT/JP2021/0141933 (filed on Nov. 15, 2021) under 35 U.S.C. § 371, which claims priority to Japanese Patent Applicaton No. 2020-212834 (filed on Dec. 22, 2020), which are all hereby incorporated by reference in their entirety.

TECHNICAL FIELD

The present invention relates to a valve device which is attached to a fuel tank of an automatic vehicle or the like and which is used as a fuel-effusion suppression valve, a full tank regulation valve, or the like.

BACKGROUND ART

For example, a valve device is attached to a fuel tank of a vehicle such as an automatic vehicle to suppress fuel in the fuel tank from leaking out of the fuel tank when the vehicle is inclined or overturned. Such a valve device generally includes a housing provided with a ventilation chamber above a partition wall having a vent hole and a valve chamber below the partition wall, and a float valve arranged in the valve chamber to be able to ascend and descend.

For example, Patent Literature 1 described below discloses a fuel leakage suppression valve having a structure in which a float valve is provided in a chamber defined inside a housing, a convex step portion protruding upward is formed at a center of an upper surface of the float valve, a retainer fixed to an upper surface side of the float valve is provided, the retainer including a flange portion covering the upper surface of the float valve and a cage portion standing from the flange portion to define an accommodation space with the convex step portion of the float valve, and a valve plate is accommodated in the accommodation space defined by the cage portion in a swingable manner. An opening portion is formed in a partition wall, and a valve seat is vertically provided from a back side peripheral edge of the opening portion. When the float valve is submerged due to, for example, fuel sloshing, the float valve ascends, the valve plate in the cage portion of the retainer abuts against the valve seat, and the opening portion formed in the partition wall is closed.

CITATION LIST

Patent Literature

Patent Literature 1: JP2007-153182A

SUMMARY OF INVENTION

Technical Problem

In the case of the valve device for a fuel tank according to Patent Literature 1, when the vehicle vibrates in a state where the float valve is submerged and the valve plate abuts against the valve seat, the float valve also vibrates, and the valve plate may be peeled off from the valve seat via the cage portion of the retainer. In this case, the valve seat may be opened and fuel may leak out of the fuel tank.

Therefore, an object of the present invention is to provide a valve device capable of suppressing fuel leakage from an opening portion even when a vehicle vibrates in a case where a float valve is submerged.

Solution to Problem

In order to achieve the above object, a valve device according to the present invention includes: a housing provided with a valve chamber configured to communicate with an inside of a fuel tank below a partition wall and a ventilation chamber configured to communicate with an outside of the fuel tank above the partition wall, and provided with an opening portion configured to communicate with the valve chamber and the ventilation chamber in the partition wall; and a float valve accommodated in the valve chamber to be able to ascend and descend, and configured to open and close the opening portion. The float valve includes a main float, a sub-float held at an upper portion of the main float to be able to ascend and descend by a predetermined distance with respect to the main float, and a sub-float biasing spring disposed between the main float and the sub-float and configured to bias the sub-float upward with respect to the main float. The sub-float includes a spring support portion configured to support an upper end of the sub-float biasing spring and a seal portion that is configured to come into contact with and separate from the opening portion. The main float is movable further upward with respect to the sub-float by compressing the sub-float biasing spring in a state where the float valve ascends and the opening portion is closed by the sub-float.

Advantageous Effects of Invention

According to the present invention, when a vehicle vibrates in a state in which the float valve is immersed in fuel, buoyancy is applied to the float valve and the float valve ascends, and the seal portion of the sub-float abuts against the opening portion to close the opening portion, the main float compresses the sub-float biasing spring and moves upward with respect to the sub-float. Therefore, the vehicle vibration can be absorbed by the movement of the main float, the state in which the seal portion abuts against the opening portion can be reliably maintained while absorbing the vehicle vibration by expansion and contraction of the sub-float biasing spring, and the fuel leakage from the opening portion to the ventilation chamber can be reliably reduced.

DESCRIPTION OF EMBODIMENTS (Embodiment of Valve Device)

Hereinafter, an embodiment of a valve device according to the present invention will be described with reference to the drawings. In the following description, "fuel" means liquid fuel (including fuel droplets), and "fuel vapor" means evaporated fuel.

Figure 1:
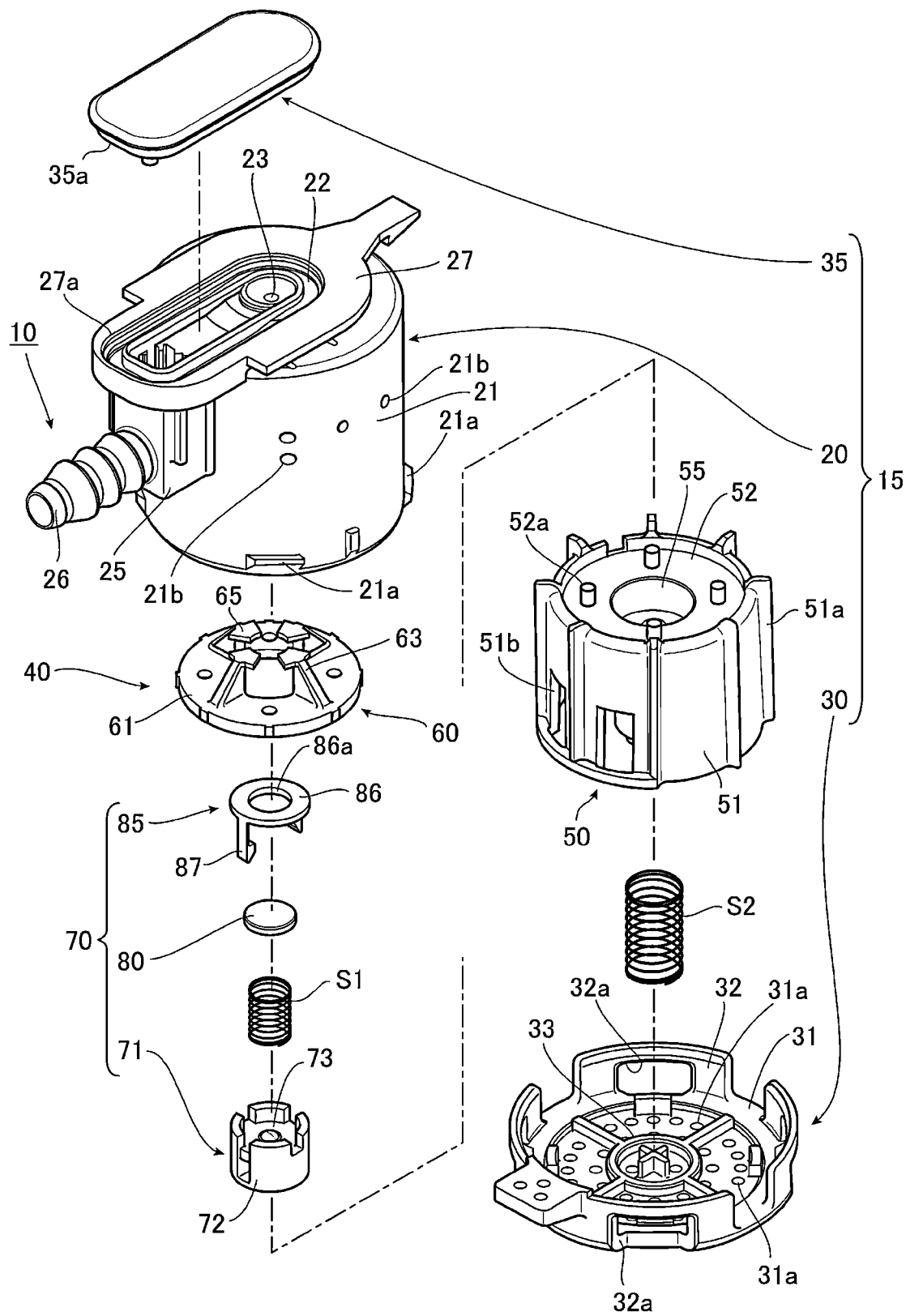
FIG. 1 shows an embodiment of a valve device according to the present invention, and is an exploded perspective view thereof.
Figure 2:
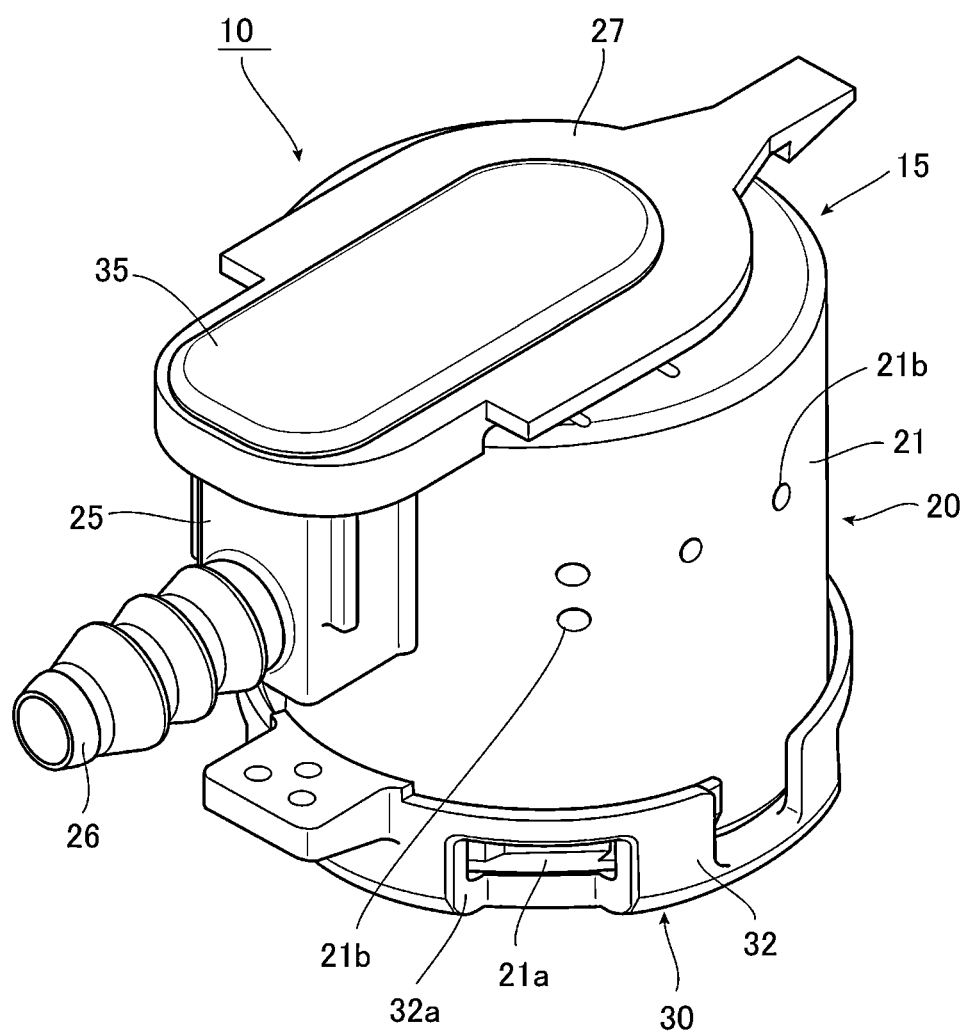
FIG. 2 is a perspective view of the valve device.
Figure 3:
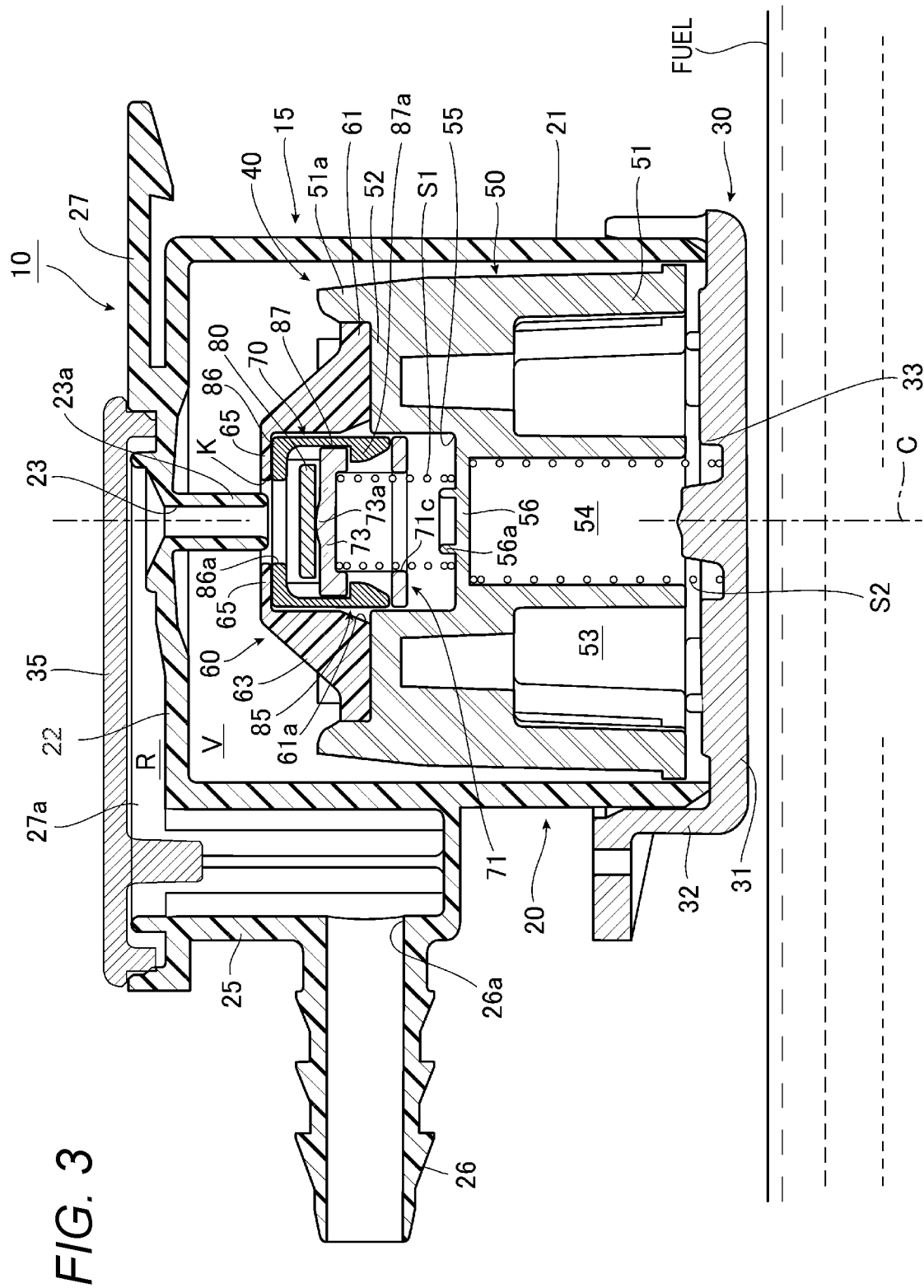
FIG. 3 is a cross-sectional view of the valve device.

As shown in FIGS. 1 to 3, a valve device 10 according to this embodiment includes a housing 15 including a valve chamber V and a ventilation chamber R, and a float valve 40 arranged in the valve chamber V to be able to ascend and descend. The float valve 40 includes a main float 50, a sub-float 70 held at an upper portion of the main float 50 to be able to ascend and descend by a predetermined distance with respect to the main float 50, and a sub-float biasing spring S1 (hereinafter also simply referred to as "biasing spring S1") which is disposed between the main float 50 and the sub-float 70 and which biases the sub-float 70 upward with respect to the main float 50. The float valve 40 according to this embodiment further includes a main float biasing spring S2 (hereinafter also simply referred to as "biasing spring S2") which biases the main float 50 upward.

Each of the biasing springs S1 and S2 is a coil spring formed by winding a wire having a predetermined diameter. A spring length (length along an axial direction) of the first biasing spring S1 is formed to be shorter than a spring length of the second biasing spring S2. In a state where the float valve 40 ascends and the opening portion 23 is closed by the sub-float 70, a spring force of the biasing spring S1 is set to be smaller than a value obtained by subtracting a weight of the float valve 40 from a sum of a spring force of the biasing spring S2 and buoyancy of the float valve 40.

First, the housing 15 will be described.

The housing 15 has a substantially cylindrical shape, and includes a housing main body 20 provided with a partition wall 22 on an upper side thereof, a lower cap 30 attached below the housing main body 20, and an upper cap 35 attached above the housing main body 20.

Figure 9:
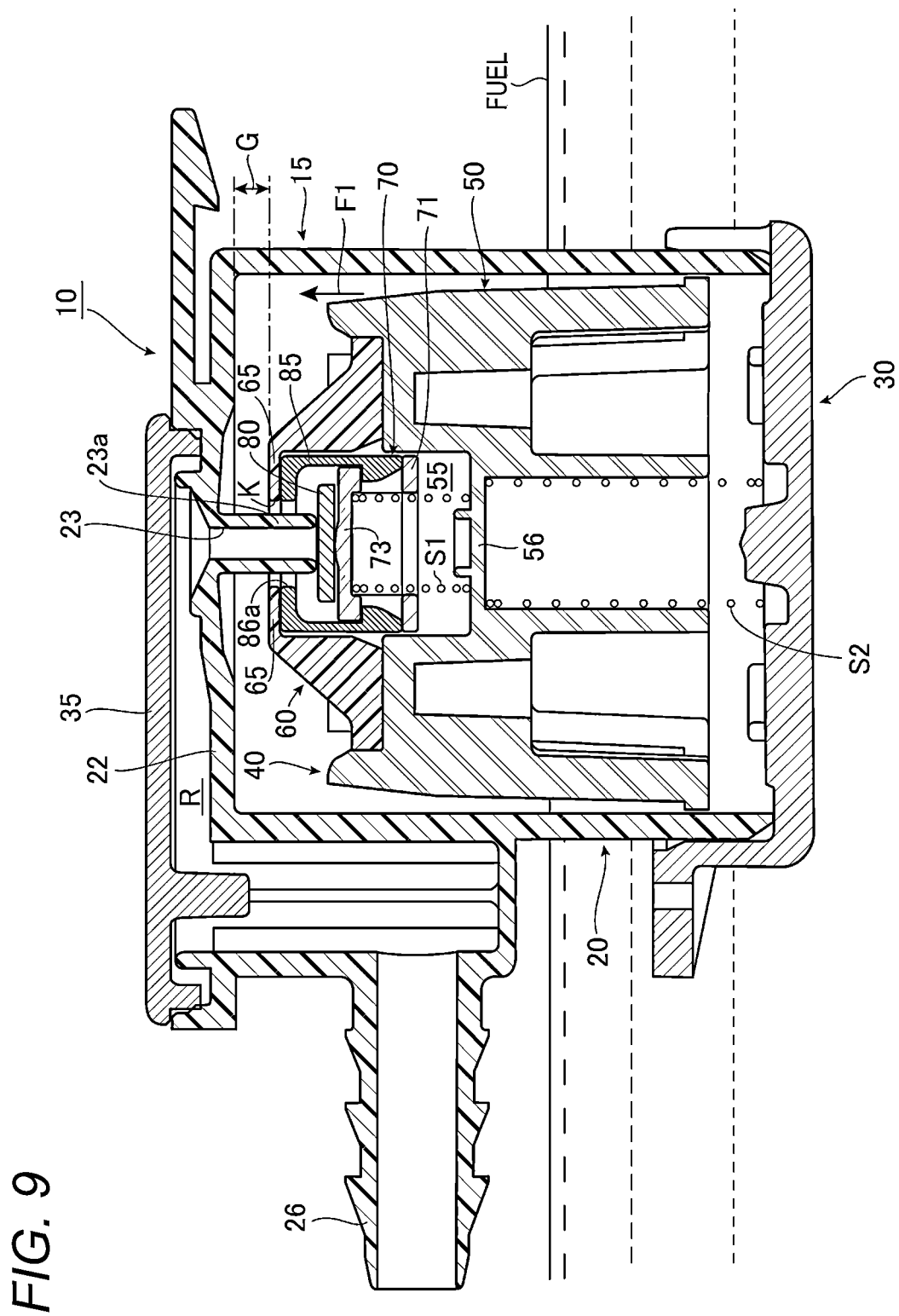
FIG. 9 is a cross-sectional view showing a state in which the float valve ascends from the state shown in FIG. 3 to close the opening portion.
Figure 10:
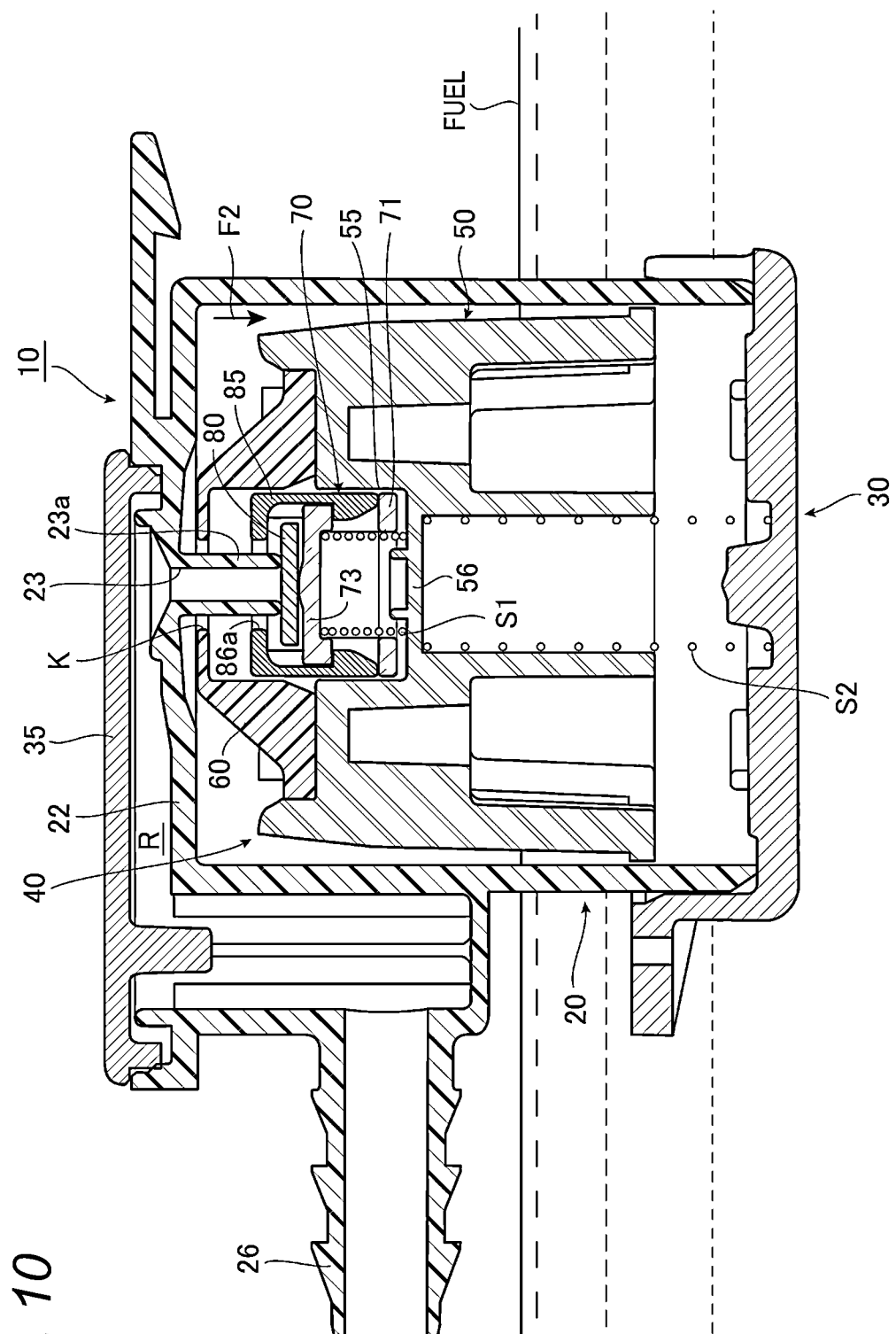
FIG. 10 is a cross-sectional view showing a state in which the main float further moves upward with respect to the sub-float, from the state shown in FIG. 9, due to vehicle vibration.

The housing main body 20 includes a peripheral wall 21 having a substantially cylindrical shape, and the partition wall 22 is disposed above the peripheral wall 21. A plurality of engagement claws 21a protrude from a lower side of the peripheral wall 21, and a plurality of vent holes 21b are formed in an upper side of the peripheral wall 21. Around opening portion 23 is formed in a central portion of the partition wall 22. As shown in FIG. 3, a valve seat 23a protrudes downward with respect to the partition wall 22 from a back side peripheral edge of the opening portion 23. The valve seat 23a according to this embodiment has a substantially cylindrical shape extending along the axial direction of the valve device 10 (direction along an axial center C of the valve device 10). The valve seat 23a constitutes a "cylindrical valve seat" according to the present invention. As shown in FIG. 3, the valve seat 23a extends by a length reaching a gap K formed inside a plurality of pressing portions 65 of a sub-float holding portion 60 to be described later when the float valve 40 descends. As shown in FIGS. 9 and 10, when the float valve 40 ascends, the valve seat 23a can pass through an insertion hole 86a of the sub-float 70 and abut against the seat valve 80 of the sub-float 70.

A box-shaped portion 25 having a bottomed box shape is provided from an upper side of an outer periphery of the peripheral wall 21. The box-shaped portion 25 is formed with a vent 26a (see FIG. 3), and a connecting pipe 26 having a substantially cylindrical shape extends outward from an outer peripheral edge portion of the vent 26a. The connecting pipe 26 is connected to a tube (not shown) communicating with a canister or the like disposed outside a fuel tank (not shown). An attachment portion 27 is provided on a surface side of the partition wall 22 to surround the opening portion 23 and an upper opening of the box-shaped portion 25. The attachment portion 27 is engaged with an attachment bracket (not shown) provided in the fuel tank, thereby attaching the valve device 10 to the inside of the fuel tank.

On the other hand, the lower cap 30 includes a bottom wall 31 having a substantially circular plate shape and a peripheral wall 32 erected from a peripheral edge of the bottom wall 31. A plurality of through holes 31a are formed in the bottom wall 31, and a plurality of engagement holes 32a are formed in the peripheral wall 32. The engagement claws 21a of the housing main body 20 are engaged with the respective engagement holes 32a of the lower cap 30, thereby attaching the lower cap 30 below the housing main body 20. As a result, a valve chamber V communicating with the fuel tank (not shown) is formed at the lower side of the housing via the partition wall 22 (see FIG. 3). A circularly protruded spring support seat 33 is provided at a central portion of the bottom wall 31. A lower end of the biasing spring S2 is supported by the spring support seat 33.

The upper cap 35 has a substantially long plate shape, and an annular wall portion 35a protrudes from a back side peripheral edge of the upper cap 35. The upper cap 35 is inserted from an upper opening portion 27a of the attachment portion 27 of the housing main body 20, whereby the annular wall portion 35a is engaged with an inner periphery of the attachment portion 27, and the upper cap 35 is attached above the housing main body 20. As a result, a ventilation chamber R communicating with the outside of the fuel tank is formed above the partition wall 22 (see FIG. 3).

Next, the float valve 40 will be described.

Figure 4:
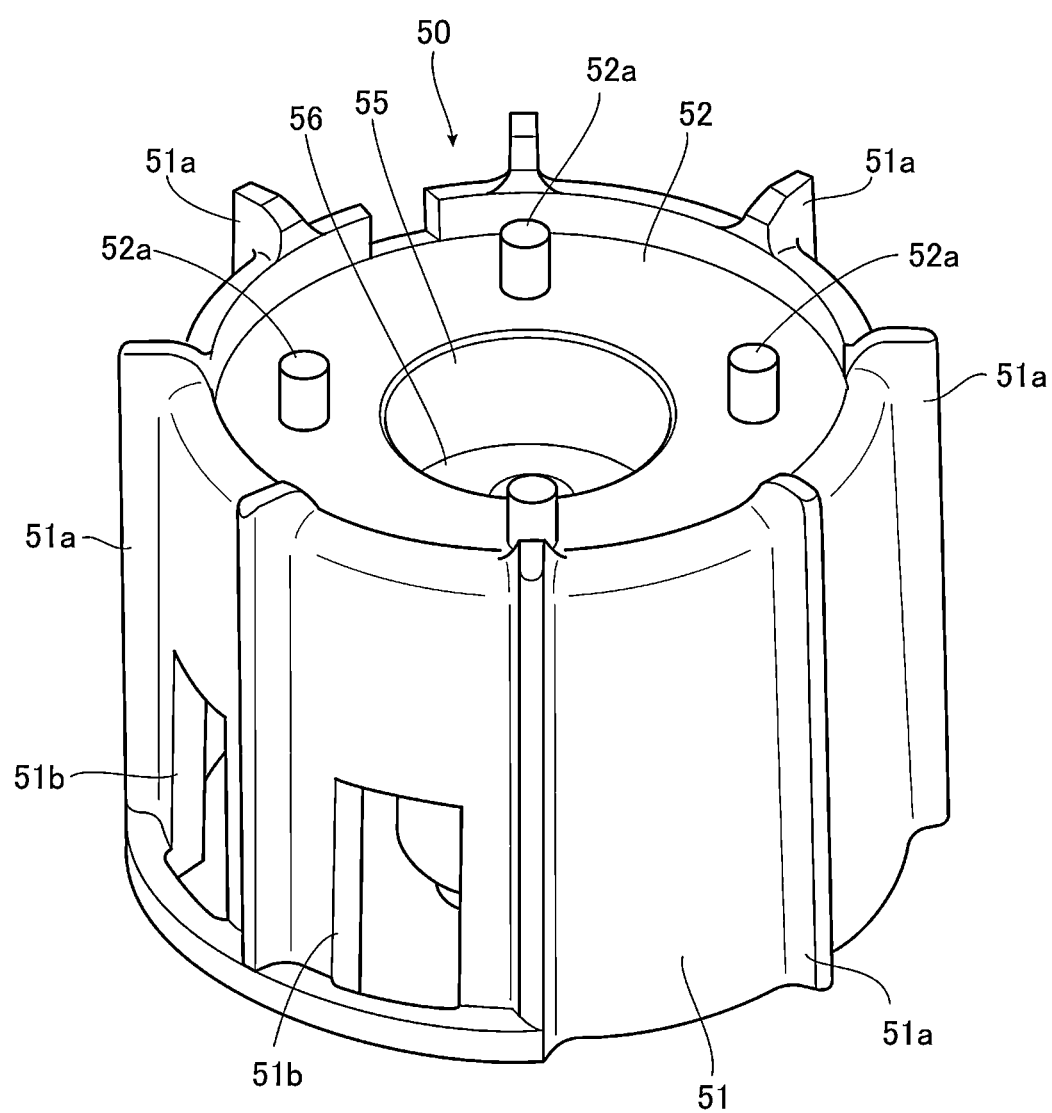
FIG. 4 is a perspective view of a main float constituting a float valve of the valve device.

As shown in FIGS. 3 and 4, the main float 50 constituting the float valve 40 includes a peripheral wall 51 having a substantially cylindrical shape, and a ceiling wall 52 which is disposed slightly below an upper end of the peripheral wall 51. Guide ribs 51a forming protrusions extending along the axial direction of the float valve 40 are provided at predetermined intervals in the peripheral direction from the outer periphery of the peripheral wall 51. An internal space 53 is formed inside the peripheral wall 51 and the ceiling wall 52 (see FIG. 3), and a plurality of opening windows 51b communicating with the internal space 53 are formed at a lower side of the peripheral wall 51. A spring accommodation recess 54 which is opened downward and recessed upward is formed in the internal space 53 from a lower surface side at a center of the ceiling wall 52 in a radial direction (see FIG. 3). The biasing spring S2 is accommodated in the spring accommodation recess 54.

A sub-float accommodation recess 55 having a concave shape opened upward and recessed downward is formed at a central portion of the ceiling wall 52 in the radial direction. The sub-float 70 is accommodated in the sub-float accommodation recess 55 to be able to ascend and descend. A plurality of engagement pins 52a protrude from an upper surface of the ceiling wall 52 at equal intervals in the peripheral direction. A first spring support portion 56 is provided at a bottom portion of the sub-float accommodation recess 55. An annular protruding spring support seat 56a protrudes from an upper surface of the first spring support portion 56 (see FIG. 3). As shown in FIG. 3, a lower end of the biasing spring S1 abuts against the upper surface of the first spring support portion 56 to support the biasing spring S1.

An upper end of the biasing spring S2 accommodated in the spring accommodation recess 54 abuts against a lower surface of the first spring support portion 56 to support the biasing spring S2. That is, as shown in FIG. 3, the biasing spring S2 is interposed between the main float 50 and the lower cap 30 in a compressed state, and an upward biasing force is applied to the main float 50 by the biasing spring S2.

The main float 50 includes a sub-float holding portion 60 which retains and holds the sub-float 70.

Figure 5:
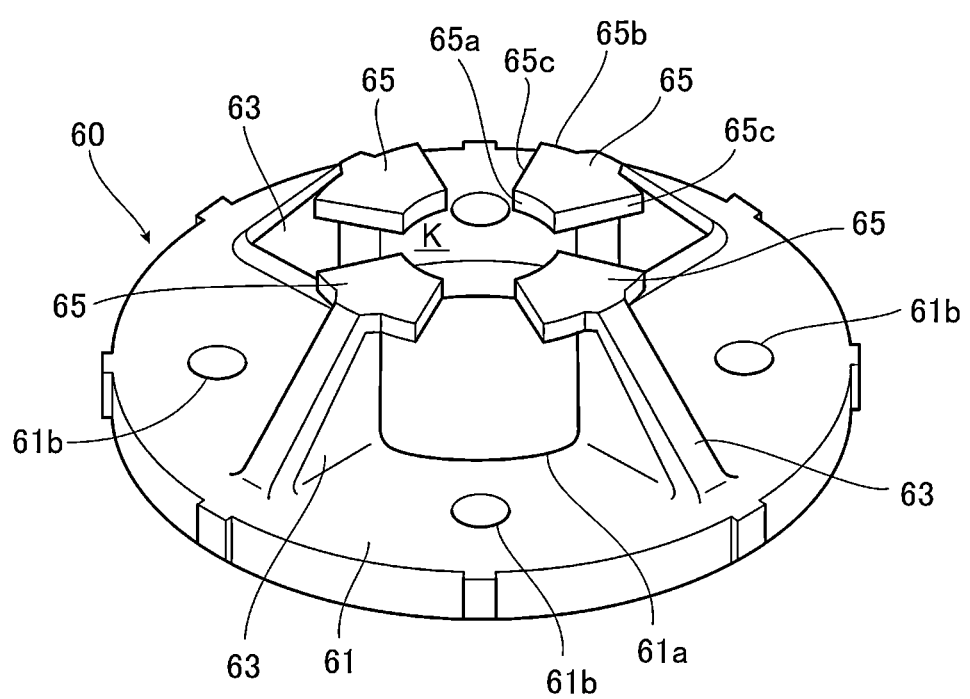
FIG. 5 is a perspective view of a sub-float holding portion constituting the float valve of the valve device.

As shown in FIGS. 3 and 5, the sub-float holding portion 60 includes a plurality of ribs 63 disposed apart from one another along the outer periphery of the sub-float 70, and the pressing portions 65 which protrude from the respective ribs 63 to be located above the sub-float 70 and which press the sub-float 70.

More specifically, the sub-float holding portion 60 according to this embodiment includes a base portion 61 having a substantially circular ring plate shape to fit the ceiling wall 52 of the main float 50. A sub-float insertion hole 61a having a circular shape is formed in a central portion of the base portion 61 in the radial direction. The sub-float 70 is inserted through the sub-float insertion hole 61a (see FIG. 3).

The plurality of ribs 63 having a substantially triangular plate shape are erected, in a radial shape, at a peripheral edge of the sub-float insertion hole 61a at an upper surface side of the base portion 61 from a center of the main float 50 in the radial direction. The pressing portions 65 project from upper end portions of the respective ribs 63 toward the center of the main float 50 in the radial direction. Regarding each of the pressing portions 65, an inner periphery 65a and an outer periphery 65b form an arc-shaped curved surface, and both side portions 65c and 65c form a tapered shape that becomes narrower toward the center of the main float 50 in the radial direction. The gap K is defined at a portion surrounded by the inner peripheries 65a of the pressing portions 65. Further, an engagement hole 61b is formed between the ribs 63 and 63 adjacent to each other in the peripheral direction of the base portion 61.

On the other hand, the sub-float 70 includes a second spring support portion 73 that supports an upper end of the sub-float biasing spring S1, and a seal portion that comes into contact with and separates from the opening portion 23. The sub-float 70 according to this embodiment includes a sub-float main body 71 including the second spring support portion 73, the seat valve 80 that forms a seal portion and is disposed above the sub-float main body 71 in a swingable manner, and a seat valve holding portion 85 that includes the insertion hole 86a and that retains and holds the seat valve 80 with respect to the sub-float main body 71.

Figure 6:
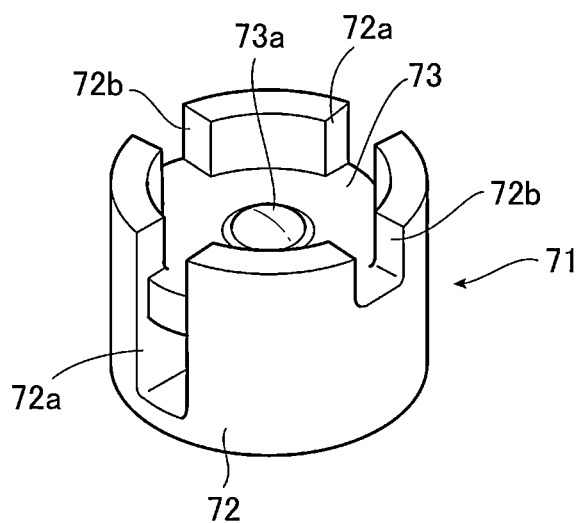
FIG. 6 is a perspective view of a sub-float main body of a sub-float constituting the float valve of the valve device.

As shown in FIG. 6, the sub-float main body 71 includes a peripheral wall portion 72 extending by a predetermined length, and a second spring support portion 73 having a substantially circular plate shape and disposed at an intermediate portion of the peripheral wall portion 72 in the axial direction. Engagement grooves 72a and 72a are formed along the axial direction at two positions facing each other in the peripheral direction of the peripheral wall portion 72. Notches 72b and 72b are formed at positions of the peripheral wall portion 72, which are orthogonal to the pair of engagement grooves 72a and 72a. A spring insertion hole 71c is formed in a lower end side of the peripheral wall portion 72 (see FIG. 3), and the biasing spring S1 can be inserted.

As shown in FIG. 3, the upper end of the biasing spring S1 abuts against and is supported by a lower surface of the second spring support portion 73. The second spring support portion 73 forms a "spring support portion that supports an upper end of a sub-float biasing spring" according to the present invention. The sub-float 70 is supported only by the biasing spring S1 via the second spring support portion 73. A seat valve support protrusion 73a having a curved shape protrudes from a center of the upper surface of the second spring support portion 73. The seat valve 80 having a circular plate shape is supported by the seat valve support protrusion 73a in a swingable manner.

Figure 7:
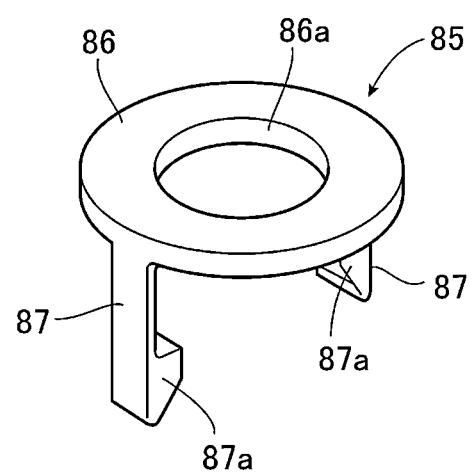
FIG. 7 is a perspective view of a seat valve holding portion of the sub-float constituting the float valve of the valve device.

As shown in FIG. 7, the seat valve holding portion 85 includes an annular pressing portion 86 including the circular insertion hole 86a, and a pair of engagement pieces 87 and 87 extending downward from outer peripheral edge portions at positions facing each other in the peripheral direction of the pressing portion 86. An inner diameter of the insertion hole 86a is smaller than an outer diameter of the seat valve 80 and larger than an outer diameter of the valve seat 23a. An engagement protrusion 87a protrudes from an inner side of a distal end portion of each of the engagement pieces 87 in an extending direction. In a state in which the seat valve 80 is supported by the seat valve support protrusion 73a, the pair of engagement pieces 87 and 87 are inserted into the pair of engagement grooves 72a and 72a, and the engagement protrusions 87a and 87a are respectively engaged with back side outer peripheral edge portions of the second spring support portion 73, whereby the sub-float 70 is assembled in a state in which the seat valve 80 is disposed between the sub-float main body 71 and the seat valve holding portion 85.

The float valve 40 can be assembled as follows, for example.

Figure 8:
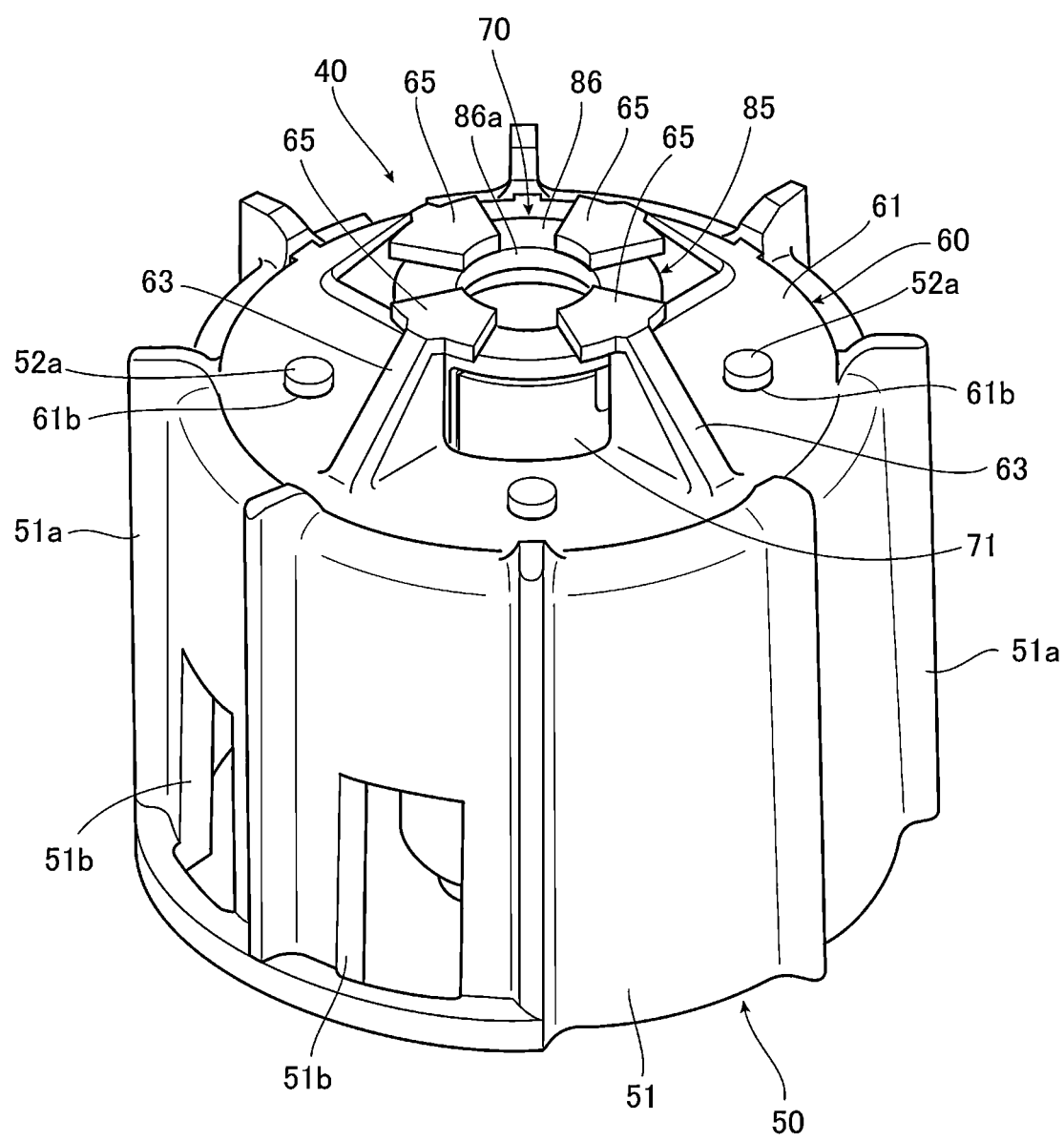
FIG. 8 is a perspective view of the float valve of the valve device.

That is, in a state in which the lower end of the first biasing spring S1 abuts against and is supported by the upper surface of the first spring support portion 56 of the sub-float accommodation recess 55 of the main float 50, the sub-float 70 is accommodated and disposed inside the sub-float accommodation recess 55, and the second spring support portion 73 is disposed at the upper end of the first biasing spring S1, whereby the sub-float 70 is supported by the biasing spring S1. Thereafter, the base portion 61 of the sub-float holding portion 60 is disposed at the ceiling wall 52 of the main float 50, and the plurality of engagement pins 52a on a ceiling wall 52 side are engaged with the corresponding plurality of engagement holes 61b on a base portion 61 side, whereby the sub-float holding portion 60 is attached above the main float 50 in a retained state, and the float valve 40 is assembled as shown in FIG. 8.

In the above state, the plurality of pressing portions 65 of the sub-float holding portion 60 are disposed above the pressing portion 86 of the seat valve holding portion 85 of the sub-float 70, and the sub-float 70 is retained and held to be able to ascend and descend between the sub-float accommodation recess 55 and the sub-float holding portion 60. At this time, the sub-float 70 is supported such that the second spring support portion 73 is disposed at the upper end of the biasing spring S1 and is separated from the first spring support portion 56 of the main float 50 (see FIG. 3). As shown in FIG. 3, in the above state, the sub-float 70 is biased upward with respect to the main float 50 by the biasing spring S1, and the pressing portion 86 of the seat valve holding portion 85 of the sub-float 70 normally abuts against the lower surfaces of the plurality of pressing portions 65 of the sub-float holding portion 60. In the state shown in FIG. 3, the seat valve 80 is separated from the valve seat 23a, and the opening portion 23 is opened.

In the valve device 10, in a state in which the float valve 40 ascends and the opening portion 23 is closed by the sub-float 70 (see FIG. 9), the biasing spring S1 is compressed as shown by an arrow F1 in FIG. 9, and the main float 50 can move further upward with respect to the sub-float 70 (see FIG. 10). In this embodiment, in a state in which the main float 50 is immersed in the fuel, the main float 50 is submerged, the float valve 40 ascends, and the seat valve 80 inside the sub-float 70 abuts against the valve seat 23a to close the opening portion 23, a gap G is formed between the upper portion of the float valve 40 (here, the pressing portion 65 of the sub-float holding portion 60) and the lower surface of the partition wall 22 as shown in FIG. 9. Therefore, the main float 50 can compress the biasing spring S1 as shown by the arrow F1 in FIG. 9, and move further upward with respect to the sub-float 70 (see FIG. 10). The main float 50 can also move downward with respect to the sub-float 70 as shown by an arrow F2 in FIG. 10.

Shapes and structures of the housing, the main float, and the sub-float described above are not limited to the above. The sub-float biasing spring and the main float biasing spring may be plate springs or the like instead of coil springs, as long as the sub-float and the main float can be biased upward.

(Operation and Effect)

Next, operations and effects of the valve device 10 according to the present invention configured as described above will be described.

As shown in FIG. 3, in a state where a fuel level in the fuel tank does not increase, the float valve 40 is not immersed in the fuel and is not submerged, the float valve 40 descends in the valve chamber V, the seat valve 80 separates from the valve seat 23a, the opening portion 23 is opened, and the valve chamber V and the ventilation chamber R communicate with each other via the opening portion 23. In this state, when the fuel vapor in the fuel tank increases due to traveling of the vehicle or the like and the tank internal pressure increases, the fuel vapor flows into the valve chamber V from the through hole 31a of the lower cap 30 and the vent hole 21b of the housing main body 20, passes through the opening portion 23, flows into the ventilation chamber R, and is sent to the canister (not shown) via the connecting pipe 26, thereby suppressing an increase in pressure in the fuel tank.

When the vehicle turns a curve, runs on an uneven road, a slope, or the like, or falls down due to an accident, the fuel in the fuel tank swings intensely and the fuel level increases, and the main float 50 of the float valve 40 is immersed in the fuel and submerged, the entire float valve 40 ascends due to the buoyancy of the main float 50 and the biasing force of the biasing spring S2. As a result, the valve seat 23a passes through the gap K formed inside the plurality of pressing portions 65 of the sub-float holding portion 60 and the insertion hole 86a of the seat valve holding portion 85 of the sub-float 70, and the seat valve 80 of the sub-float 70 abuts against the valve seat 23a, thereby closing the opening portion 23, as shown in FIG. 9. As a result, the fuel in the valve chamber V can be suppressed from flowing into the ventilation chamber R through the opening portion 23, and the fuel leakage to the outside of the fuel tank can be suppressed.

Vibration may be applied to the vehicle in a state where the main float 50 is submerged and the seat valve 80 abuts against the valve seat 23a to close the opening portion 23, as shown in FIG. 9. At this time, the main float 50 can compress the sub-float biasing spring S1, as shown by the arrow F1 in FIG. 9, and the main float 50 can move further upward with respect to the sub-float 70 (see FIG. 10). Therefore, vibration of the vehicle can be absorbed by such upward movement of the main float 50. At the same time, it is possible to reliably maintain the state in which the seat valve 80 abuts against the valve seat 23a (that is, the state in which the opening portion 23 is closed by the seal portion) while absorbing the vehicle vibration by expansion and contraction of the sub-float biasing spring S1, and it is possible to reliably suppress the fuel leakage from the opening portion 23 to the ventilation chamber R.

In this embodiment, the main float biasing spring S2 that biases the main float 50 upward is provided, and in a state in which the float valve 40 ascends and the opening portion 23 is closed by the sub-float 70, the spring force of the biasing spring S1 is set to be smaller than a value obtained by subtracting the weight of the float valve 40 from the sum of the spring force of the biasing spring S2 and the buoyancy of the float valve 40.

When the main float biasing spring S2 is adopted as described above, the main float biasing spring S2 makes it easier for the main float 50 to ascend when the main float 50 is submerged. However, even in this case, when the vehicle vibrates in a state in which the float valve 40 is immersed in fuel, buoyancy is applied to the float valve 40 and the float valve 40 ascends, and the seal portion (seat valve 80) of the sub-float 70 abuts against the opening portion 23 to close the opening portion 23, the spring force of the biasing spring S1 is set to be smaller than the value obtained by subtracting the weight of the float valve 40 from the sum of the spring force of the biasing spring S2 and the buoyancy of the float valve 40. Therefore, the seal portion of the sub-float 70 can be reliably maintained in a state of abutting against the opening portion 23 to close the opening portion 23, and fuel leakage from the opening portion 23 to the ventilation chamber R can be more reliably suppressed.

In this embodiment, the sub-float 70 includes the sub-float main body 71 including the second spring support portion 73, the seat valve 80 that forms a seal portion and is disposed above the sub-float main body 71 in a swingable manner, and the seat valve holding portion 85 that includes the insertion hole 86a and retains and holds the seat valve 80 with respect to the sub-float main body 71. The valve device 10 includes the valve seat 23a that protrudes downward with respect to the partition wall 22 from a back side peripheral edge of the opening portion 23 and that can pass through the insertion hole 86a and abut against the seat valve 80 when the float valve 40 ascends.

According to the above aspect, the sub-float 70 has the above structure, and when the float valve 40 ascends, the valve seat 23a passes through the insertion hole 86a of the seat valve holding portion 85 and abuts against the seat valve 80. Therefore, when the vehicle vibrates in a state where the main float 50 is submerged and ascends, and the seat valve 80 abuts against the valve seat, the seat valve 80 is less likely to peel off from the valve seat 23a, and the fuel leakage from the opening portion 23 to the ventilation chamber R can be further suppressed.

In this embodiment, the main float 50 includes the sub-float holding portion 60 that retains and holds the sub-float 70, and the sub-float holding portion 60 includes the plurality of ribs 63 disposed apart from one another along the outer circumference of the sub-float 70, and the pressing portions 65 that protrudes from the respective ribs 63 to be located above the sub-float 70, and that presses the sub-float 70.

Therefore, when the vehicle vibrates in a state in which the main float 50 is submerged and ascends and the seat valve 80 abuts against the valve seat 23a, the fuel is discharged from between the rib 63 and the rib 63, and it is possible to make it difficult for the liquid pressure of the fuel to be applied to the seat valve 80 (seal portion) of the sub-float 70. As a result, the seat valve 80 is easily maintained in a state of abutting against the valve seat 23a, and the fuel leakage from the opening portion 23 to the ventilation chamber R can be further suppressed.

(Other Embodiments of Valve Device)

FIGS. 11 to 16 show other embodiments of the valve device according to the present invention. The same reference numerals are given to substantially the same parts as those in the above embodiment, and the description thereof will be omitted.

Figure 11:
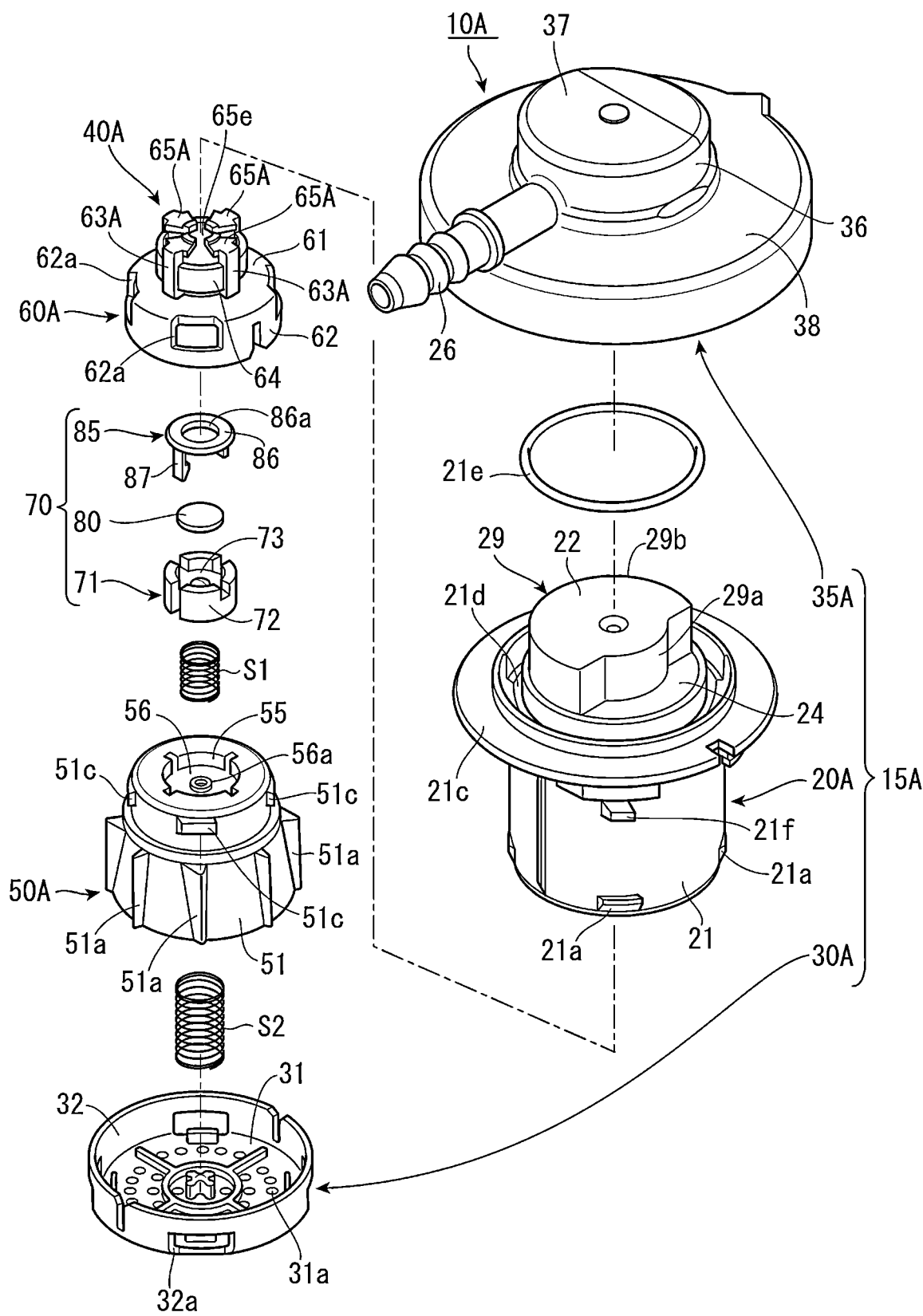
FIG. 11 shows another embodiment of the valve device according to the present invention, and is an exploded perspective view thereof.
Figure 12:
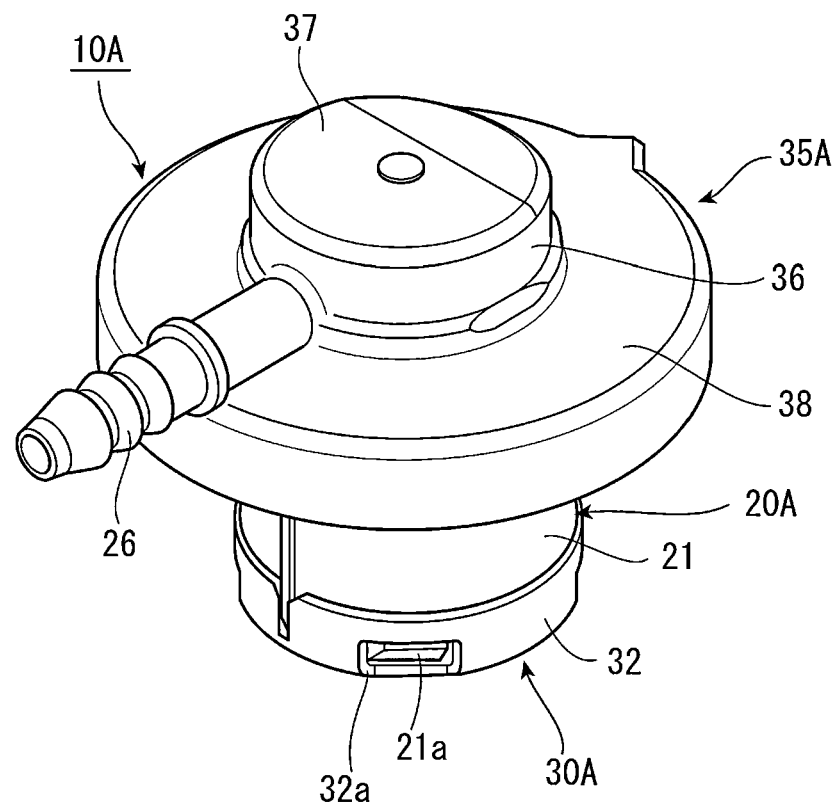
FIG. 12 is a perspective view of the valve device.
Figure 14:
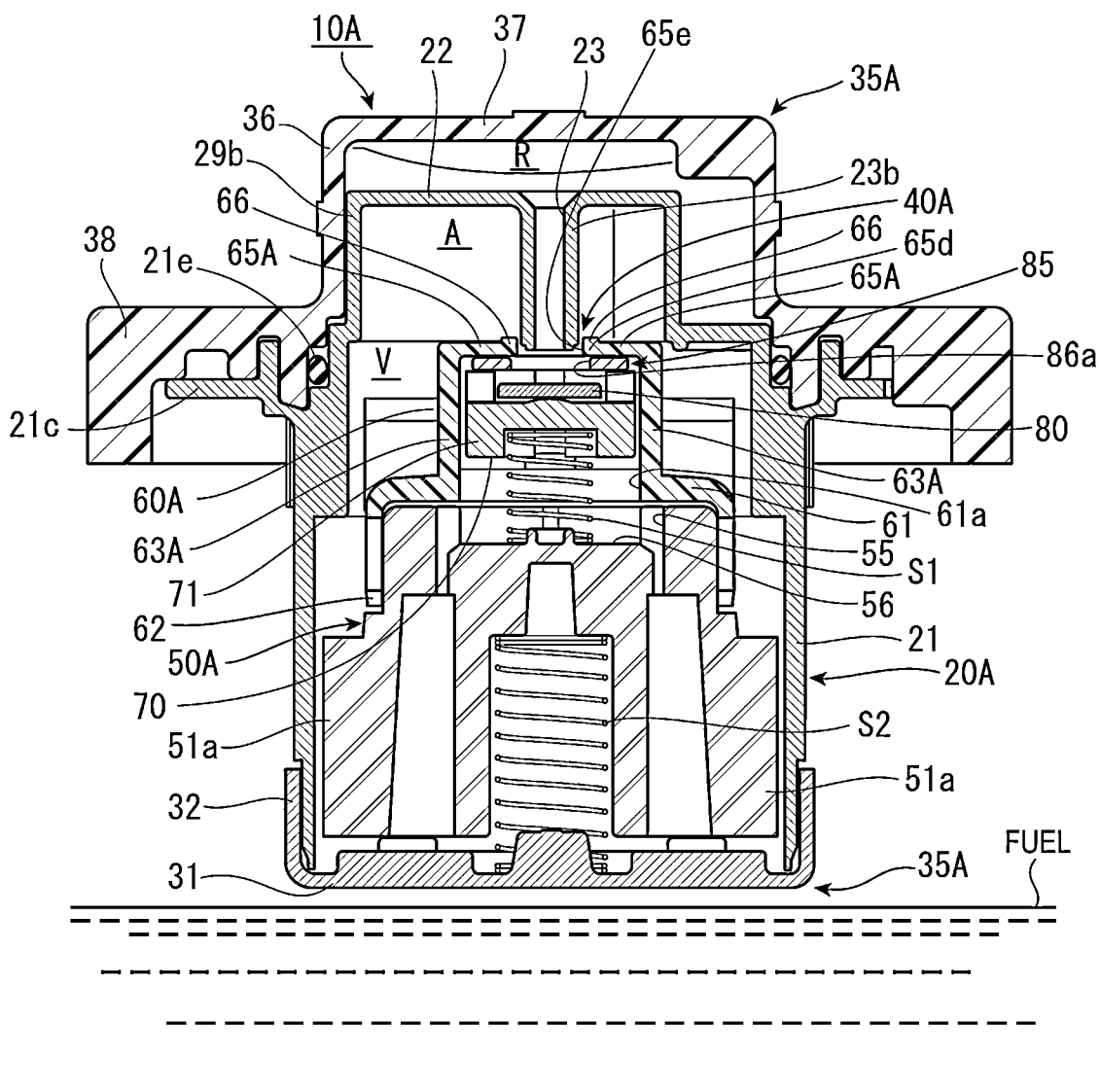
FIG. 14 is a cross-sectional view of the valve device.

As shown in FIGS. 11 and 14, a valve device 10A according to this embodiment includes a housing 15A and a float valve 40A as in the embodiment shown in FIGS. 1 to 10. The float valve 40A includes a main float 50A, a sub-float 70, a sub-float biasing spring S1 (biasing spring S1), and a main float biasing spring S2 (biasing spring S2). The housing 15A includes a housing main body 20A, a lower cap 30A attached below the housing main body 20A, and an upper cap 35A attached above the housing main body 20A. The main float 50A includes a sub-float holding portion 60A that retains and holds the sub-float 70.

In the housing main body 20A, a shelf-shaped wall 24 having a shelf shape is provided at a position close to an upper side of the peripheral wall 21, an upright wall 29 is erected from a peripheral edge of the shelf-shaped wall 24, and the partition wall 22 is disposed above the upright wall 29. The upright wall 29 includes a first arc-shaped wall 29a having a circular arc shape and a predetermined outer diameter and a second arc-shaped wall 29b disposed on the opposite side of the first arc-shaped wall 29a and having a circular arc shape and a larger diameter than the first arc-shaped wall 29a. The second arc-shaped wall 29b of the upright wall 29 and the partition wall 22 define a large space A (see FIGS. 13 and 14) above the housing main body 20A.

A flange portion 21c projects from an upper outer periphery of the peripheral wall 21. A ring attachment groove 21d is formed inside the flange portion 21c, and an annular seal ring 21e is attached to the ring attachment groove 21d. A plurality of engagement claws 21f protrude at positions of the peripheral wall 21 lower than the flange portion 21c.

The upper cap 35A has a substantially hat shape including a peripheral wall 36 having a substantially circular outer periphery, a ceiling wall 37 disposed above the peripheral wall 36, and a flange portion 38 extending outward from a lower side of the peripheral wall 36. A vent (not shown) is formed in the peripheral wall 36, and the connecting pipe 26 extends in an outer diameter direction from a front peripheral edge. A plurality of engagement pieces (not shown) are vertically provided from predetermined positions of the flange portion 38 in the peripheral direction. By engaging the plurality of engagement pieces to the respective plurality of engagement claws 21f provided at the housing main body 20A, the upper cap 35A is attached above the housing main body 20A in a state where the seal ring 21e attached in the ring attachment groove 21d abuts against an inner periphery of the peripheral wall 36 of the upper cap 35A (see FIG. 12). As a result, the ventilation chamber R communicating with the outside of the fuel tank is formed above the partition wall 22 (see FIG. 14).

Figure 13:
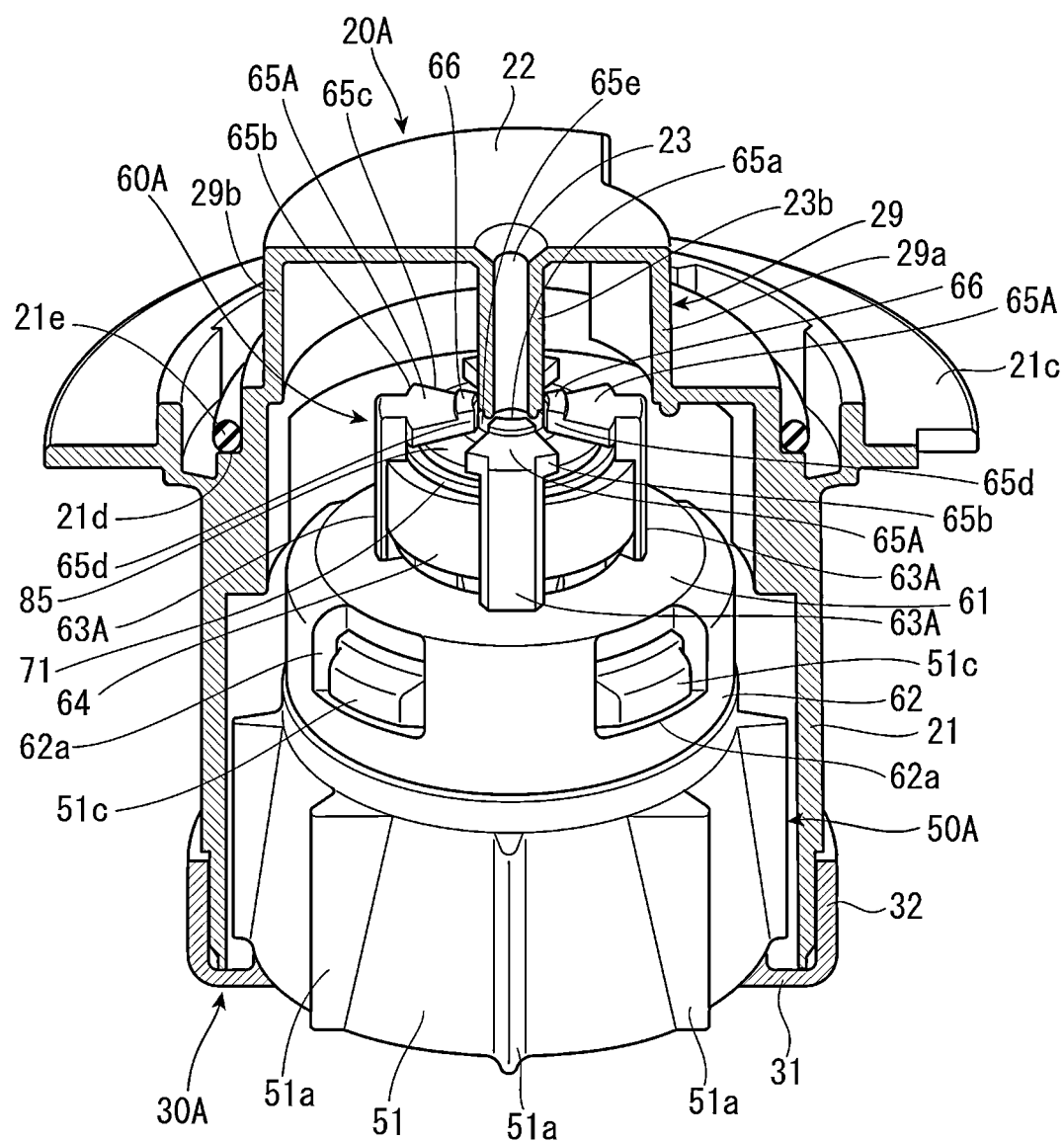
FIG. 13 is a perspective view of the valve device in which a housing is shown in cross section.

As shown in FIGS. 13 and 14, the housing 15A includes a cylindrical valve seat 23b that protrudes downward with respect to the partition wall 22 of the housing main body 20A in a cylindrical shape from the back side peripheral edge of the opening portion 23. As shown in FIG. 14, the cylindrical valve seat 23b extends by a length that allows insertion into the sub-float holding portion 60A, in a state in which the main float 50A is not immersed in fuel. The cylindrical valve seat 23b according to this embodiment has a lower end portion extending by a length reaching the intermediate portion of the pressing portion 65A of the sub-float holding portion 60A in the thickness direction (see FIG. 14).

The sub-float 70 includes the sub-float main body 71 including the second spring support portion 73, the seat valve 80 that forms a seal portion and is disposed above the sub-float 70 (here, the sub-float main body 71) in a swingable manner, and the seat valve holding portion 85 that retains and holds the seat valve 80 with respect to the sub-float main body 71. The seat valve holding portion 85 includes the insertion hole 86a through which the cylindrical valve seat 23b is inserted.

As shown in FIG. 11, a plurality of engagement protrusions 51c protrude from an outer periphery of an upper end portion of the peripheral wall 51 having a substantially cylindrical shape of the main float 50A at equal intervals in the peripheral direction. The peripheral wall 51 includes an upper portion formed with a constant outer diameter, and has a tapered shape whose diameter gradually increases from a lower end of the constant outer diameter portion toward a lowermost end. The plurality of guide ribs 51a forming protrusions are provided at equal intervals in the peripheral direction on the outer periphery of the tapered portion of the peripheral wall 51.

As shown in FIG. 11, the main float 50A includes the sub-float holding portion 60A that retains and holds the sub-float 70, and the sub-float holding portion 60A includes the pressing portion 65A that is located above the sub-float 70 and that presses the sub-float 70. As shown in FIGS. 13 and 14, the sub-float holding portion 60A includes an insertion opening 65e which is located above the insertion hole 86a and through which the cylindrical valve seat 23b is inserted.

Specifically, the sub-float holding portion 60A according to this embodiment includes the base portion 61 having a substantially circular ring plate shape and provided with the sub-float insertion hole 61a (see FIG. 14) at the central portion in the radial direction, and the peripheral wall 62 provided vertically downward from an outer peripheral edge of the base portion 61. The plurality of engagement holes 62a are formed at equal intervals in the peripheral direction above the peripheral wall 62. The engagement protrusions 51c of the main float 50A are engaged with the corresponding engagement holes 62a, whereby the sub-float holding portion 60A is attached above the main float 50A in a retained state (see FIG. 13).

A plurality of ribs 63A having long plate shape are vertically provided at equal intervals in the peripheral direction from a peripheral edge of the sub-float insertion hole 61a on an upper surface side of the base portion 61. The ribs 63A and 63A adjacent to each other in the peripheral direction are connected to each other by an arc-shaped wall 64, and the entire ribs 63A are reinforced.

The pressing portion 65A projects from the upper end portion of each rib 63A toward the center of the main float 50A in the radial direction. As shown in FIG. 13, each pressing portion 65A includes an inner periphery 65a and an outer periphery 65b each having an arc-shaped curved surface, and both side portions 65c and 65c each has a tapered shape whose width gradually decreases toward the center of the main float 50 in the radial direction, as in the embodiment shown in FIGS. 1 to 10. As shown in FIG. 14, the pressing portion 65A extends toward the cylindrical valve seat 23b such that a distal end portion 65d thereof (end portion facing a center side of the main float 50A in the radial direction) projects in the inner diameter direction from the insertion hole 86a of the seat valve holding portion 85.

As shown in FIGS. 13 and 14, the insertion opening 65e through which the cylindrical valve seat 23b is inserted is formed in a portion surrounded by the inner periphery of the distal end portion 65d of each pressing portion 65A. As shown in FIG. 14, an edge portion of the insertion opening 65e (inner peripheral edge portion disposed along the inner peripheral surface of the insertion opening 65e) extends toward the cylindrical valve seat 23b to project in the inner diameter direction from an edge portion of the insertion hole 86a (inner peripheral edge portion disposed along the inner peripheral surface of the insertion hole 86a) provided in the seat valve holding portion 85.

A protrusion 66 protruding in the axial direction of the cylindrical valve seat 23b is provided at the edge portion of the insertion opening 65e. As shown in FIGS. 13 and 14, the protrusion 66 protrudes along the axial direction of the cylindrical valve seat 23b from the upper surface side of the pressing portion 65A which is the inner peripheral edge portion of the insertion opening 65e in this embodiment.

As shown in FIG. 14, in the valve device 10A, the cylindrical valve seat 23b is inserted into the sub-float holding portion 60A in a state in which the main float 50A is not immersed in fuel, the cylindrical valve seat 23b and the sub-float holding portion 60A constitute a first ascent and descent guide above the float valve 40A, and a lower outer periphery of the main float 50A and an inner periphery of the housing 15A constitute a second ascent and descent guide below the float valve 40A. The ascent and descent guide means a guide when the float valve 40A ascends and descends in the valve chamber V in accordance with fluctuation of the fuel level in the valve chamber V (see arrows in an upper-lower direction in FIGS. 15 and 16).

In the case of this embodiment, the cylindrical valve seat 23b and the insertion opening 65e protruding in the inner diameter direction from the edge portion of the insertion hole 86a constitute the first ascent and descent guide. That is, as shown in FIGS. 13 and 14, the cylindrical valve seat 23b protruding downward from the partition wall 22 of the housing main body 20A is inserted and disposed inside the insertion opening 65e provided in the sub-float holding portion 60A, thereby constituting the first ascent and descent guide of the float valve 40A.

The outer periphery of the guide rib 51a of the main float 50A is disposed at the inner periphery of the peripheral wall 21 of the housing main body 20A constituting the housing 15A, thereby constituting the second ascent and descent guide of the float valve 40A.

In the embodiment shown in FIGS. 1 to 10, the first ascent and descent guide and the second ascent and descent guide are constituted (see FIG. 3), similarly to the embodiment shown in FIGS. 11 to 16.

In the case of this embodiment, in a state where the float valve 40A ascends and the opening portion 23 is closed by the sub-float 70, the spring force of the biasing spring S1 is set to be smaller than a value obtained by subtracting the weight of the float valve 40A from the sum of the spring force of the biasing spring S2 and the buoyancy of the float valve 40A, similarly to the embodiment shown in FIGS. 1 to 10.

(Operation and Effect)

Next, operations and effects of the valve device 10A having the above structure will be described.

Figure 15:
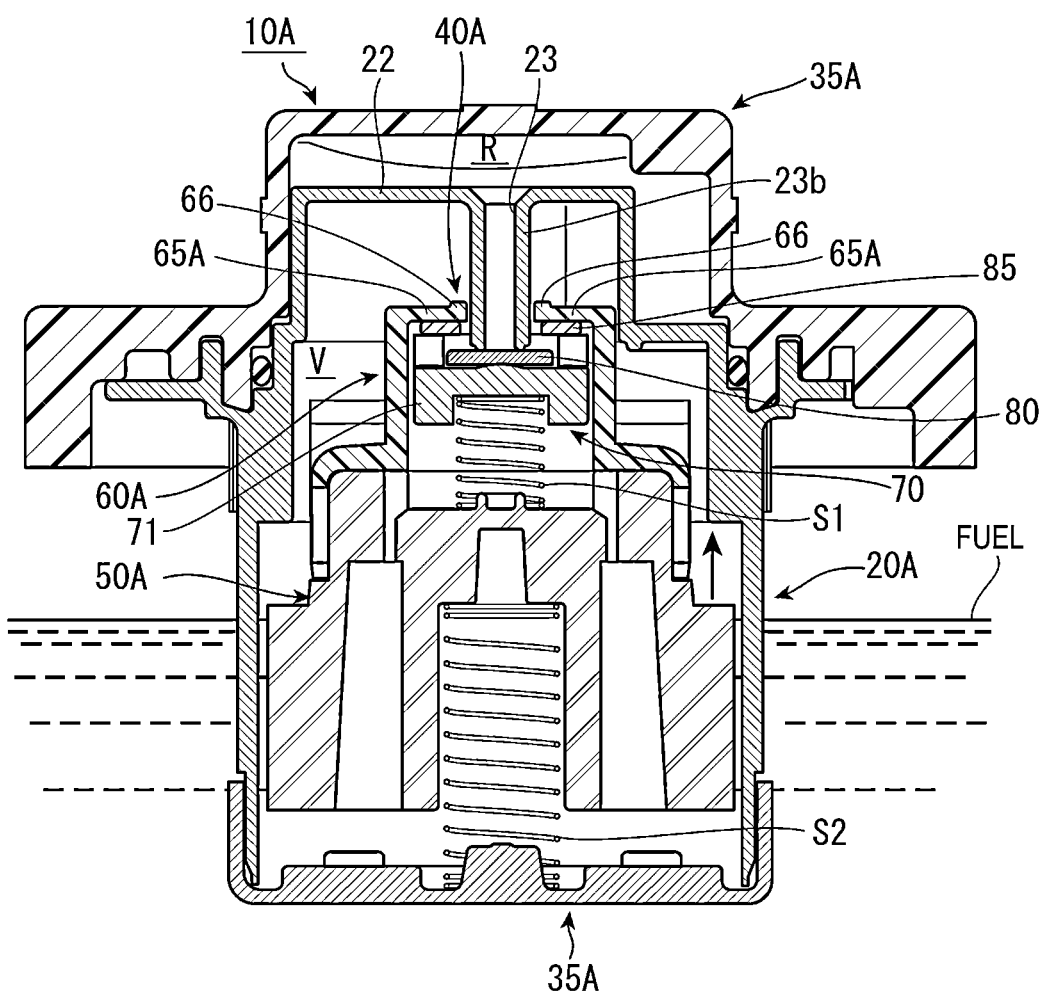
FIG. 15 is a cross-sectional view showing a state in which a float valve ascends from a state shown in FIG. 14 to close an opening portion.
Figure 16:
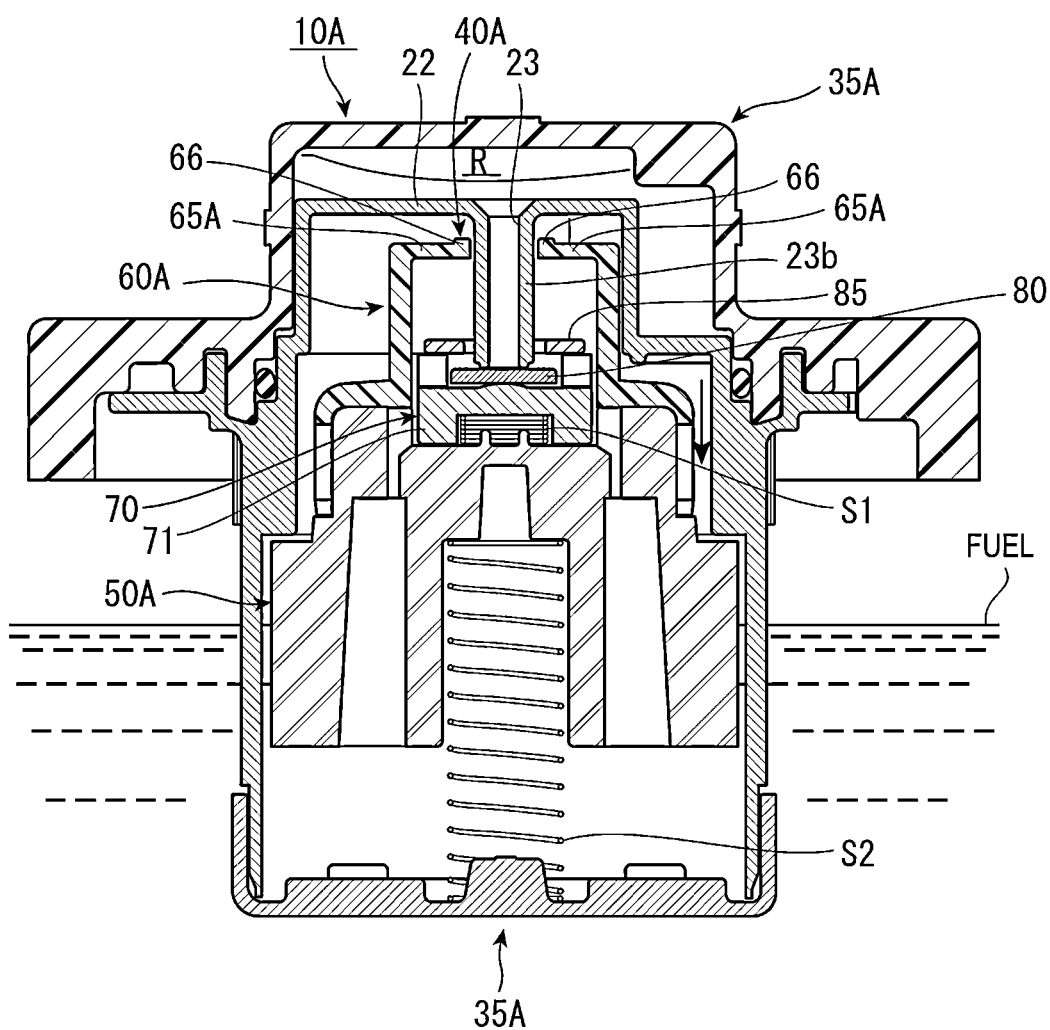
FIG. 16 is a cross-sectional view showing a state in which a main float further moves upward with respect to a sub-float, from the state shown in FIG. 15, due to vehicle vibration.

In this embodiment, when the vehicle travels on an uneven road, slope, or the like from the state shown in FIG. 14, the main float 50A is immersed in the fuel and submerged, and the entire float valve 40A ascends, the lower end portion of the cylindrical valve seat 23b passes through the distal end portions 65d of the plurality of pressing portions 65A and the insertion hole 86a of the seat valve holding portion 85, and abuts against the seat valve 80 to close the opening portion 23 as shown in FIG. 15, similarly to the embodiment described above. As a result, the fuel in the valve chamber V can be suppressed from flowing into the ventilation chamber R through the opening portion 23, and the fuel leakage to the outside of the fuel tank can be suppressed. When vibration is applied to the vehicle in the state shown in FIG. 15, the main float 50A compresses the biasing spring S1 and is moveable further upward with respect to the sub-float 70 (see FIG. 16). Therefore, the vibration of the vehicle can be absorbed. In this way, the state in which the seat valve 80 abuts against the cylindrical valve seat 23b can be reliably maintained while absorbing the vehicle vibration by the expansion and contraction of the biasing spring S1, and the fuel leakage from the opening portion 23 to the ventilation chamber R can be reliably suppressed.

In this embodiment, in a state where the float valve 40A ascends and the opening portion 23 is closed by the sub-float 70, the spring force of the biasing spring S1 is set to be smaller than the value obtained by subtracting the weight of the float valve 40A from the sum of the spring force of the biasing spring S2 and the buoyancy of the float valve 40A. Therefore, when the vehicle vibrates in a state in which the seal portion (seat valve 80) of the sub-float 70 abuts against the opening portion 23 to close the opening portion 23, the seat valve 80 can be reliably maintained in a state of abutting against the opening portion 23 to close the opening portion 23, and the fuel leakage from the opening portion 23 to the ventilation chamber R can be more reliably suppressed.

In this embodiment, the cylindrical valve seat 23b is inserted into the sub-float holding portion 60A in a state in which the main float 50A is not immersed in fuel, the cylindrical valve seat 23b and the sub-float holding portion 60A constitute the first ascent and descent guide above the float valve 40A, and the lower portion of the main float 50A and the inner periphery of the housing 15A constitute the second ascent and descent guide below the float valve 40A, as shown in FIG. 14.

Therefore, since the ascent and descent movement of the float valve 40A is guided by the two ascent and descent guides above and below the float valve 40, it is possible to enhance the guiding performance when the float valve 40A ascends and descends, and it is possible to cause the seal portion (here, the seat valve 80) to abut against the opening portion 23 in a stable posture.

Further, since the upper side of the float valve 40A is guided by the first ascent and descent guide constituted by the cylindrical valve seat 23b and the sub-float holding portion 60A, the degree of freedom in the shape of the inner periphery of the housing 15A can be increased. Therefore, it is not necessary to separately provide a guide structure for the float valve 40A at an outer position above the float valve 40A, and a large space A (see FIG. 14) as shown in FIG. 14 can be formed at the upper portion of the inner side of the housing 15A. The space A can function as a space (vapor accumulation) in which fuel vapor accumulates, and thus contributes to suppression of fuel leakage to the ventilation chamber R.

In this embodiment, the sub-float 70 includes the seat valve holding portion 85A which retains and holds the seat valve 80 forming a seal portion and disposed above the sub-float 70, the seat valve holding portion 85 includes the insertion hole 86a through which the cylindrical valve seat 23b is inserted, the sub-float holding portion 60A includes the insertion opening 65e which is located above the insertion hole 86a and through which the cylindrical valve seat 23b is inserted, the edge portion of the insertion opening 65e extends toward the cylindrical valve seat 23b to protrude in the inner diameter direction from the edge portion of the insertion hole 86a, and the insertion opening 65e and the cylindrical valve seat 23b constitute the first ascent and descent guide (see FIG. 14).

According to the above aspect, the edge portion of the insertion opening 65e forming the first ascent and descent guide extends toward the cylindrical valve seat 23b to protrude in the inner diameter direction from the edge portion of the insertion hole 86a as shown in FIG. 14. Therefore, the lower end portion of the cylindrical valve seat 23b also forming the first ascent and descent guide can be suppressed from abutting against the insertion hole 86a of the seat valve holding portion 85A. As a result, the ascent and descent guide for the float valve 40A above the float valve 40A by the first ascent and descent guide and constituted by the insertion opening 65e and the cylindrical valve seat 23b can be more reliably performed.

In this embodiment, the protrusion 66 protruding in the axial direction of the cylindrical valve seat 23b is provided at an edge portion of the insertion opening 65e, as shown in FIGS. 13 and 14.

According to the above aspect, since the protrusion 66 protruding in the axial direction of the cylindrical valve seat 23b is provided at the edge portion of the insertion opening 65e, it is possible to secure a long axial length (length along the axial direction of the cylindrical valve seat 23b) of the insertion opening 65e forming the first ascent and descent guide in a state where the main float 50A is not immersed in the fuel, and it is possible to more reliably perform the ascent and descent guide of the float valve 40A above the float valve 40A by the first ascent and descent guide constituted by the insertion opening 65e and the cylindrical valve seat 23b.

EXAMPLE

When a valve device was set in a fuel tank and subjected to a vibration test, the degree of leakage of fuel from the opening portion was tested.

Example

A valve device according to Example including a housing, a float valve including a main float and a sub-float, and the like similar to the valve device shown in FIGS. 1 to 10 was manufactured.

Comparative Example

A valve device according to Comparative Example including a float valve without a main float or a sub-float was manufactured.

Test Method

The valve devices according to the above Example and Comparative Example were attached, a test tank into which a predetermined amount of liquid flowed was set in known vibration testing apparatus, and vibration in an upper-lower direction was applied. The leakage amount (ml/min) of the liquid from the opening portion was measured. The test conditions were acceleration of 5 G, frequency of 28.8 Hz, and amplitude of 1.5 mm. Measurement was performed three times for each of two patterns including a case where the internal pressure of the test tank was atmospheric pressure and a case where the pressure was pressurized to a predetermined pressure (4.9 kPa). The results were shown in Table 1 below.

TABLE 1

|  |  | Liquid leakage (ml/min) | |
|---|---|---|---|
|  |  | Atmospheric pressure | 4.9 kPa |
| Example | 1 | 0.1 | 0.9 |
|  | 2 | 1 | 0.3 |
|  | 3 | 0.9 | 0.3 |
| Comparative example | 1 | 14 | 54 |
|  | 2 | 13.2 | 59.1 |
|  | 3 | 33.4 | 56.9 |

It was confirmed that in the valve device according to Example, the leakage amount of the liquid from the opening portion was small in both cases where the tank internal pressure was the atmospheric pressure and the pressurized state of 4.9 kPa, as compared with the valve device according to Comparative Example.

The present invention described above is not limited to the above embodiments, various modifications can be made within the scope of the gist of the present invention, and such embodiments are also included in the scope of the present invention.

REFERENCE SIGNS LIST 10, 10A valve device
15,15A housing
20,20A housing main body
22 partition wall
23 opening portion
23a valve seat
23b cylindrical valve seat 30, 30A lower cap
35, 35A upper cap
40, 40A float valve
50, 50A main float
60, 60A sub-float holding portion
63, 63A rib
65, 65A pressing portion
66 protrusion
65e insertion opening
70 sub-float
71 sub-float main body
73 second spring support portion (spring support portion)
80 seat valve
85 seat valve holding portion
86a insertion hole
S1 sub-float biasing spring
S2 main float biasing spring

The invention claimed is:

1. A valve device comprising:
   a housing provided with a valve chamber configured to communicate with an inside of a fuel tank below a partition wall and a ventilation chamber configured to communicate with an outside of the fuel tank above the partition wall, and provided with an opening portion configured to communicate with the valve chamber and the ventilation chamber in the partition wall; and
   a float valve accommodated in the valve chamber to be able to ascend and descend, and configured to open and close the opening portion, wherein
   the float valve includes
      a main float,
      a sub-float held at an upper portion of the main float to be able to ascend and descend by a predetermined distance with respect to the main float, and
      a sub-float biasing spring disposed between the main float and the sub-float and configured to bias the sub-float upward with respect to the main float,
   the sub-float includes a spring support portion configured to support an upper end of the sub-float biasing spring and a seal portion that is configured to come into contact with and separate from the opening portion,
   the housing includes a cylindrical valve seat protruding downward with respect to the partition wall in a cylindrical shape from a back side peripheral edge of the opening portion,
   the main float includes a sub-float holding portion configured to retain and hold the sub-float,
   a first ascent and descent guide is constituted above the float valve by the cylindrical valve seat and the sub-float holding portion, and a second ascent and descent guide is constituted below the float valve by a lower portion of the main float and the housing,
   the sub-float includes
      a sub-float main body including the spring support portion,
      a seat valve forming the seal portion and disposed above the sub-float main body, and
      a seat valve holding portion including an insertion hole and configured to retain and hold the seat valve with respect to the sub-float main body, and
   the cylindrical valve seat is configured to abut against the seat valve through the insertion hole when the float valve ascends.

2. The valve device according to claim 1, further comprising:
   a main float biasing spring configured to bias the main float upward, wherein
   in a state where the float valve ascends and the opening portion is closed by the sub-float, a spring force of the sub-float biasing spring is set to be smaller than a value obtained by subtracting a weight of the float valve from a sum of a spring force of the main float biasing spring and buoyancy of the float valve.

3. The valve device according to claim 1, wherein
   the sub-float holding portion includes a plurality of ribs disposed apart from one another along an outer periphery of the sub-float, and pressing portions protruding from the respective ribs to be located above the sub-float and configured to press the sub-float.

4. The valve device according to claim 1, wherein
   the main float is movable further upward with respect to the sub-float by compressing the sub-float biasing spring in a state where the float valve ascends and the opening portion is closed by the sub-float.

5. A valve device comprising:
   a housing provided with a valve chamber configured to communicate with an inside of a fuel tank below a partition wall and a ventilation chamber configured to communicate with an outside of the fuel tank above the partition wall, and provided with an opening portion configured to communicate with the valve chamber and the ventilation chamber in the partition wall; and
   a float valve accommodated in the valve chamber to be able to ascend and descend, and configured to open and close the opening portion, wherein
   the float valve includes
      a main float,
      a sub-float held at an upper portion of the main float to be able to ascend and descend by a predetermined distance with respect to the main float, and
      a sub-float biasing spring disposed between the main float and the sub-float and configured to bias the sub-float upward with respect to the main float,
   the sub-float includes a spring support portion configured to support an upper end of the sub-float biasing spring and a seal portion that is configured to come into contact with and separate from the opening portion,
   the housing includes a cylindrical valve seat protruding downward with respect to the partition wall in a cylindrical shape from a back side peripheral edge of the opening portion,
   the main float includes a sub-float holding portion configured to retain and hold the sub-float,
   a first ascent and descent guide is constituted above the float valve by the cylindrical valve seat and the sub-float holding portion, and a second ascent and descent guide is constituted below the float valve by a lower portion of the main float and the housing,
   the sub-float includes
      an insertion hole through which the cylindrical valve seat is to be inserted,
   the sub-float holding portion includes an insertion opening located above the insertion hole and through which the cylindrical valve seat is inserted, and
   an edge portion of the insertion opening extends toward the cylindrical valve seat to protrude in an inner diameter direction with respect to an edge portion of the insertion hole, and the insertion opening and the cylindrical valve seat constitute the first ascent and descent guide.

6. The valve device according to claim 5, wherein
the edge portion of the insertion opening is provided with a protrusion protruding in an axial direction of the cylindrical valve seat.

\* \* \* \* \*